US012437917B2

(12) United States Patent
Yamada et al.

(10) Patent No.: US 12,437,917 B2
(45) Date of Patent: Oct. 7, 2025

(54) METHOD FOR MANUFACTURING RARE EARTH SINTERED MAGNET

(71) Applicant: Shin-Etsu Chemical Co., Ltd., Tokyo (JP)

(72) Inventors: Akira Yamada, Echizen (JP); Tetsuya Ohashi, Echizen (JP); Koichi Hirota, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 10 days.

(21) Appl. No.: 17/516,232

(22) Filed: Nov. 1, 2021

(65) Prior Publication Data

US 2022/0148801 A1 May 12, 2022

(30) Foreign Application Priority Data

Nov. 12, 2020 (JP) ................................ 2020-188449

(51) Int. Cl.
*H01F 41/02* (2006.01)
*B22F 7/02* (2006.01)
(Continued)

(52) U.S. Cl.
CPC ............ *H01F 41/0266* (2013.01); *B22F 7/02* (2013.01); *B22F 9/04* (2013.01); *B22F 9/082* (2013.01);
(Continued)

(58) Field of Classification Search
CPC ...... B22F 9/04; B22F 2301/45; H01F 1/0577; H01F 41/0293; C22C 38/005
See application file for complete search history.

(56) References Cited

U.S. PATENT DOCUMENTS

2009/0297699 A1 12/2009 Baba et al.
2011/0000586 A1* 1/2011 Nomura ................ C22C 1/1094 148/514
(Continued)

FOREIGN PATENT DOCUMENTS

CN 107689279 A * 2/2018
JP 2009-289994 A 12/2009
(Continued)

OTHER PUBLICATIONS

Paul D Jablonski, Homogenization of Metal Alloys, 2016, ASM International, ASM Handbook vol. 4E, pp. 32-37 (Year: 2016).*
(Continued)

*Primary Examiner* — Christina A Johnson
(74) *Attorney, Agent, or Firm* — Birch, Stewart, Kolasch & Birch, LLP

(57) ABSTRACT

A rare earth sintered magnet is manufactured by preparing a $R^1$-T-X sintered body having a major phase of $R^1_2T_{14}X$ composition wherein $R^1$ is a rare earth element(s) and essentially contains Pr and/or Nd, T is Fe, Co, Al, Ga, and/or Cu, and essentially contains Fe, and X is boron and/or carbon, forming an alloy powder containing $5 \leq R^2 \leq 60$, $5 \leq M \leq 70$, and $20 < B \leq 70$, in at %, wherein $R^2$ is a rare earth element(s) and essentially contains Dy and/or Tb, M is Fe, Cu, Al, Co, Mn, Ni, Sn, and/or Si, and B is boron, disposing the alloy powder on the sintered body, and heat treating the alloy-covered sintered body.

26 Claims, 6 Drawing Sheets

(51) Int. Cl.

| | |
|---|---|
| ***B22F 9/04*** | (2006.01) |
| ***B22F 9/08*** | (2006.01) |
| ***C22C 28/00*** | (2006.01) |
| ***H01F 1/057*** | (2006.01) |

(52) U.S. Cl.

CPC .......... *C22C 28/00* (2013.01); *B22F 2301/45* (2013.01); *C22C 2202/02* (2013.01); *H01F 1/0577* (2013.01)

(56) References Cited

U.S. PATENT DOCUMENTS

| | | | | |
|---|---|---|---|---|
| 2012/0086531 | A1 | 4/2012 | Nagata et al. | |
| 2012/0229240 | A1 | 9/2012 | Yoshimura et al. | |
| 2014/0375404 | A1* | 12/2014 | Kuniyoshi ................ | H01F 7/02 427/127 |

FOREIGN PATENT DOCUMENTS

| | | | |
|---|---|---|---|
| WO | 2007/102391 | A1 | 9/2007 |
| WO | 2008/023731 | A1 | 2/2008 |

OTHER PUBLICATIONS

Machida et al., "Grain Boundary Modification and Magnetic Properties of Nd—Fe—B Sintered Magnets", Abstracts of Spring Meeting of Japan Society of Powder and Powder Metallurgy, 2004, pp. 202, total 3 pages.

Park et al., "Effect of Metal-Coating and Consecutive Heat Treatment on Coercivity of Thin Nd—Fe—B Sintered Magnets", Proceedings of the Sixteen International Workshop on Rare-Earth Magnets and Their Applications, Sendai, 2000, pp. 257-264.

Extended European Search Report issued Apr. 19, 2022, in European Patent Application No. 21207857.0.

* cited by examiner

INVENTIVE MAGNET 4 (B: 40at%)

INVENTIVE MAGNET 5 (B: 30at%)

COMPARATIVE MAGNET 7 (B: 20at%)

COMPARATIVE MAGNET 8 (B: 0at%)

METHOD FOR MANUFACTURING RARE EARTH SINTERED MAGNET

CROSS-REFERENCE TO RELATED APPLICATION

This non-provisional application claims priority under 35 U.S.C. § 119(a) on Patent Application No. 2020-188449 filed in Japan on Nov. 12, 2020, the entire contents of which are hereby incorporated by reference.

TECHNICAL FIELD

This invention relates to a method for manufacturing a rare earth sintered magnet having a high remanence and coercivity.

BACKGROUND ART

Nd—Fe—B sintered magnets find a continuously expanding range of applications including hard disk drives, air conditioners, industrial motors, generators and drive motors of hybrid and electric vehicles. While compressor motors, vehicle-mount generators, and drive motors are expected of further development, the Nd—Fe—B magnets are exposed to high temperature in these applications. The Nd—Fe—B magnets are thus required to further improve the stability of their properties at high temperature, that is, to be heat resistant.

It is believed that the coercivity creating mechanism of Nd—Fe—B magnets responsible to heat resistance is the nucleation type wherein the nucleation of reverse magnetic domains at grain boundaries of $R_2Fe_{14}B$ major phase governs a coercive force. Substituting Dy or Tb for part of R increases the anisotropic magnetic field of the $R_2Fe_{14}B$ phase to suppress the likelihood of nucleation of reverse magnetic domains whereby the coercivity (sometimes abbreviated as Hcj, hereinafter) is increased. When Dy or Tb is added to a mother alloy, however, Dy or Tb substitution takes place not only near the interface of major phase grains, but even in the interior of the grains. Then a lowering of saturation magnetic flux density results in a loss of remanence or residual magnetic flux density (sometimes abbreviated as Br, hereinafter). Another problem is an increased amount of Tb and Dy which are rare and face a high supply risk from the resource aspect.

The grain boundary diffusion technology involves disposing a suitable rare earth element such as Dy or Tb on the surface of a sintered body matrix, and effecting heat treatment for causing Dy or Tb to diffuse into the interior of the sintered body matrix mainly along grain boundaries in the sintered body matrix. A structure having Dy or Tb enriched in a high concentration is thus formed at and around the grain boundaries for thereby increasing the coercivity (Hcj) in an efficient manner. For the grain boundary diffusion technology, a variety of techniques have been devised. For example, Patent Document 1 and Non-Patent Documents 1 and 2 describe that a rare earth element such as Yb, Dy, Pr or Tb is deposited on the surface of a Nd—Fe—B magnet by evaporation or sputtering, followed by heat treatment. Patent Document 2 discloses heat treatment of a sintered body in a Dy vapor atmosphere for diffusion of Dy into the sintered body from its surface. Patent Document 3 discloses use of an intermetallic compound powder containing a rare earth element.

CITATION LIST

Patent Document 1: WO 2008/023731

Patent Document 2: WO 2007/102391

Patent Document 3: JP-A 2009-289994

Non-Patent Document 1: K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000)

Non-Patent Document 2: K. Machida, H. Kawasaki, S. Suzuki, M. Ito and T. Horikawa, "Grain Boundary Modification and Magnetic Properties of Nd—Fe—B Sintered Magnets" Abstracts of Spring Meeting of Japan Society of Powder and Powder Metallurgy, 2004, p. 202

SUMMARY OF INVENTION

With the techniques described in the prior art documents, a single metal compound including Dy or Tb or an intermetallic compound containing a rare earth element such as Dy or Tb and a transition metal element is used as the diffusion source and disposed on the surface of a magnet to form a cover on the magnet. In the subsequent heat treatment, the diffusion source, infiltrates and diffuses along liquid grain boundaries in the magnet. Alternatively, Dy or Tb is infiltrated and diffused from the magnet surface to the magnet interior via a vapor phase. Then the Dy or Tb concentration in the grain boundary phase is significantly increased in proximity to the magnet surface. This suggests a possibility that Dy or Tb diffuses into the interior of $R_2Fe_{14}B$ major phase crystal grains to invite a noticeable drop of saturation magnetization.

The following problem arises in the mass manufacturing technique relying on the grain boundary diffusion technology. During the heat treatment, the diffusion source melts by itself or melts as a result of reaction with molten magnet grain boundary phase components and diffuses into the magnet interior. If magnets are placed in close contact, the molten diffusion source on one magnet can fuse to the surface of the adjacent magnet.

Further, in the vapor phase-mediated diffusion technique as described in Patent Document 2, an individual magnet must have an interface with the vapor phase. When a plurality of magnets are treated at the same time, the magnets must be discrete. One solution is for plural magnets to place on a flat plate during heat treatment. Since the magnets are heat treated together with the plates, the net weight of magnets loaded in a furnace is reduced, leading to a considerable loss of throughput.

An object of the invention is to provide a method for manufacturing a rare earth sintered magnet meeting both a high remanence (Br) and high coercivity (Hcj) at a high productivity, wherein the coercivity (Hcj) of a R—Fe—B magnet can be fully increased while suppressing a lowering of remanence (Br) by grain boundary diffusion treatment.

The inventors have reached the following discovery. It is assumed that $R^1$ and $R^2$ each are at least one element selected from rare earth elements, $R^1$ essentially contains Pr and/or Nd, $R^2$ essentially contains Dy and/or Tb, T is at least one element selected from Fe, Co, Al, Ga, and Cu and essentially contains Fe, X is boron and/or carbon, M is at least one element selected from Fe, Cu, Al, Co, Mn, Ni, Sn and Si, and B is boron. A rare earth sintered magnet having a high coercivity (Hcj) is prepared by disposing an alloy powder containing $R^2$, M and B on the surface of a $R^1$-T-X sintered body, and heat treating the alloy-covered sintered body for causing $R^2$ to be absorbed by and diffused into the sintered body for thereby enhancing Hcj. By adding boron to the $R^2$-containing alloy as the diffusion source and adjusting the contents of $R^2$, M and B in the alloy to an appropriate range, specifically $5 \le R^2 \le 60$, $5 \le M \le 70$, and $20 \le B \le 70$, expressed in at %, it becomes possible to prevent the Dy or Tb concentration in proximity to the magnet surface from a sharp rise. As a result, a decline of Br after diffusion treatment is effectively restrained. Even when a plurality of magnets are arrayed in mutual contact, the grain boundary diffusion treatment using the above alloy powder is effective for suppressing mutual reaction for preventing the adjacent magnets from fusing together. This leads to a higher throughput.

In one aspect, the invention provides a method for manufacturing a rare earth sintered magnet comprising the steps of:

- preparing a $R^1$-T-X sintered body having a major phase of $R^1_2T_{14}X$ composition wherein $R^1$ is at least one element selected from rare earth elements and essentially contains Pr and/or Nd, T is at least one element selected from the group consisting of Fe, Co, Al, Ga, and Cu and essentially contains Fe, and X is boron and/or carbon,
- forming an alloy powder containing $R^2$, M and B wherein $R^2$ is at least one element selected from rare earth elements and essentially contains Dy and/or Tb, M is at least one element selected from the group consisting of Fe, Cu, Al, Co, Mn, Ni, Sn and Si, and B is boron, the alloy containing 5 to 60 at % of $R^2$, 5 to 70 at % of M, and from more than 20 at % to 70 at % of B,
- disposing the alloy powder on the surface of the sintered body, and
- heat treating the alloy-covered sintered body in vacuum or inert gas atmosphere at a temperature not higher than the sintering temperature of the sintered body.

In a preferred embodiment, the alloy contains at least one phase selected from $R^2MB_4$, $R^2M_2B_2$, $R^2M_4B_4$, $R^2_3MB_7$, and $R^2_5M_2B_6$ phases as the major phase.

In preferred embodiments, the alloy powder forming step includes:

- melting metal feeds containing $R^2$, M and B by high frequency induction heating, plasma arc melting or electric arc melting;
- homogenizing the alloy in vacuum or inert gas atmosphere at 500 to 1,200° C. for 1 to 500 hours;
- milling the alloy in inert gas atmosphere;
- atomizing the alloy into spherical particles by the gas atomization method;
- forming an oxide powder of $R^2$, M and B from a metal salt and/or metal salt hydrate by the sol-gel method, and subjecting the oxide powder to reductive diffusion reaction with a reducing agent; and/or
- adjusting the average particle size of the alloy powder to a range of 1 to 50 μm, expressed as a volume basis median diameter $D_{50}$ by the laser diffraction method based on gas flow dispersion.

Advantageous Effects of Invention

The method of preparing a rare earth magnet by grain boundary diffusion treatment according to the invention enables to increase the coercivity (Hcj) of the magnet while minimizing a decline of remanence (Br). The rare earth sintered magnet meeting both a high remanence (Br) and high coercivity (Hcj) can be manufactured at a high productivity.

BRIEF DESCRIPTION OF ACCOMPANYING DRAWINGS

DESCRIPTION OF PREFERRED EMBODIMENTS

Figure 1:
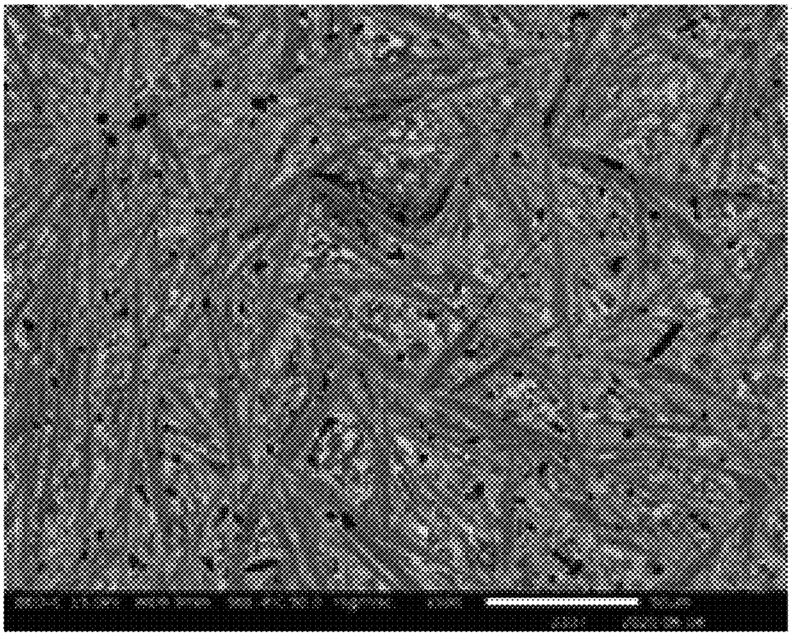
FIG. 1 is a backscattered electron composition image of a powder-forming alloy prior to homogenization treatment in Example 1.

Generally, the method for manufacturing a rare earth sintered magnet according to the invention involves the steps of preparing a $R^1$-T-X sintered body having a major phase of $R^1_2T_{14}X$ composition, forming an alloy powder containing $R^2$, M and B, disposing the alloy powder on the surface of the sintered body, and heat treatment.

The first step is to prepare a $R^1$-T-X sintered body which is a matrix of the desired rare earth sintered magnet, sometimes referred to as sintered body matrix. Although the composition is not particularly limited, preferably the sintered body consists of 12 to 17 at % of $R^1$, 4 to 8 at % of X, and the balance of T, with incidental impurities being acceptable.

$R^1$ is at least one element selected from rare earth elements, scandium (Sc), and yttrium (Y) and essentially contains praseodymium (Pr) and/or neodymium (Nd). From the aspect of obtaining a sintered magnet having satisfactory coercivity (Hcj) and remanence (Br), the content of $R^1$ is preferably 12 to 17 at % and more preferably up to 16 at %.

X is boron and/or carbon. From the aspect of securing the volume percent of the major phase or the aspect of preventing magnetic properties from degrading due to an increase of minor-phase content, the content of X is preferably 4 to 8 at % and more preferably 5.0 to 6.7 at %.

T is at least one element selected from the group consisting of Fe, Co, Al, Ga, and Cu and essentially contains Fe. The content of T is the balance of the sintered body overall composition, preferably at least 75 at %, more preferably at least 77 at %, and preferably up to 84 at %, more preferably up to 83 at %. If desired, part of T may be replaced by such elements as Si, Ti, V, Cr, Mn, Ni, Zn, Ge, Zr, Nb, Mo, Ag, In, Sn, Sb, Hf, Ta, W, Pt, Au, Pb, and Bi. The content of replacement element should preferably be up to 10 at % of the overall sintered body to avoid any decline of magnetic properties.

It is permissible that the sintered body contains oxygen (O) and nitrogen (N). The contents of O and N are preferably as low as possible, with the exclusion of O and N being more preferable. However, the magnet preparation process accompanies inevitable introduction of such elements. In this sense, an oxygen content of up to 1.5 at %, especially up to 1.2 at %, and a nitrogen content of up to 0.5 at %, especially up to 0.3 at % are permissible.

In addition to the foregoing elements, such elements as H, F, Mg, P, S, Cl and Ca may be present as incidental impurities. It is permissible that the total content of incidental impurities is up to 0.1 at % based on the total of the sintered body constituting elements and incidental impurities. Preferably the content of incidental impurities is as low as possible.

The $R^1$-T-X sintered body consists of crystal grains having an average diameter which is preferably up to 6 μm, more preferably up to 5.5 μm, even more preferably up to 5 μm, from the aspects of suppressing detrimental effects such as a decline of coercivity and maintaining the productivity of fine particles. Also, the average diameter is preferably at least 1.5 μm, more preferably at least 2 μm. The average diameter of grains may be controlled, for example, by adjusting the average particle size of alloy fine powder during fine milling. The average diameter of grains may be measured, for example, by the following procedure. First, a cross section of a sintered body is polished to mirror finish. The cross section is immersed in an etchant such as vilella solution (mixture of glycerol:nitric acid:hydrochloric acid=3:1:2) for selectively etching the grain boundary, and observed under a laser microscope. On analysis of the image, the cross-sectional area of individual grains is determined, from which the diameter of an equivalent circle is computed. Based on the data of area fraction of each grain size, the average diameter is determined. The average diameter is, for example, an average of totally about 2,000 grains within images of 20 different spots.

The $R^1$-T-X sintered body resulting from the sintered body preparing step preferably has a remanence Br at room temperature (~23° C.) of at least 11 kG (1.1 T), more preferably at least 11.5 kG (1.15 T), even more preferably at least 12 kG (1.2 T). Also, the $R^1$-T-X sintered body preferably has a coercivity Hcj at room temperature (~23° C.) of at least 6 kOe (478 kA/m), more preferably at least 8 kOe (637 kA/m), even more preferably at least 10 kOe (796 kA/m).

The step of preparing the $R^1$-T-X sintered body (sintered body matrix) is basically the same as the standard powder metallurgy. The step includes, for example, the steps of preparing a finely divided alloy having a predetermined composition (the step including melting metal feeds into a mother alloy and finely dividing the mother alloy), compacting the finely divided alloy under an applied magnetic field into a compact, sintering the compact at a sintering temperature into a sintered body, and cooling after sintering.

In the melting step in the sintered body preparing step, metal or alloy feeds are metered in accordance with the predetermined composition, for example, a composition consisting of 12 to 17 at % of $R^1$ which is at least one element selected from rare earth elements, Sc and Y and essentially contains Pr and/or Nd, 4 to 8 at % of X which is boron and/or carbon, and the balance of T which is at least one element selected from Fe, Co, Al, Ga, and Cu and essentially contains Fe, and typically free of O and N. The metal or alloy feeds are melted in vacuum or inert gas atmosphere, preferably inert gas atmosphere, typically Ar gas, for example, by RF induction heating. On cooling, a mother alloy is obtained. The mother alloy is cast, for example, by a standard melt casting technique of casting into a flat mold or book mold, or strip casting technique. If the initial crystal of a-Fe is left in the cast alloy, the alloy is heat treated, for example, in vacuum or inert gas atmosphere such as Ar gas at a temperature of 700 to 1,200° C. for at least 1 hour, for homogenizing the micro-structure and eliminating the a-Fe phase. Also applicable to the preparation of the sintered body matrix is a so-called two-alloy process involving separately preparing an alloy approximate to the $R_2Fe_{14}X$ compound composition constituting the major phase of the relevant alloy and a rare earth-rich alloy serving as sintering aid, crushing, weighing and mixing them.

In the finely dividing step in the sintered body preparing step, the mother alloy is first crushed or coarsely ground to a size of about 0.05 to 3 mm. The crushing step generally uses a Brown mill or hydrogen decrepitation. The coarse powder is then finely divided on a jet mill or ball mill, for example, on a jet mill using high-pressure nitrogen into a fine particle powder having an average particle size of typically 0.5 to 20 μm, especially 1 to 10 μm. If desired, a lubricant or another additive may be added in the crushing and/or fine milling step.

In the compacting step, the finely divided alloy is molded or compacted by a compression molding machine under an applied magnetic field, for example, a magnetic field of 5 kOe (398 kA/m) to 20 kOe (1,592 kA/m) for orienting the direction of easy axis of magnetization of alloy particles. The compacting step is preferably carried out in vacuum or inert gas atmosphere, typically nitrogen or Ar gas atmosphere, for preventing the finely divided alloy from oxidation. This is followed by the step of sintering the green compact. The sintering step is typically carried out in vacuum or inert gas atmosphere at a sintering temperature of 900 to 1,250° C., preferably 1,000 to 1,100° C. This may be followed by heat treatment, if necessary. Some or all of the series of steps may be carried out in an atmosphere having a reduced oxygen content for preventing oxidation. The sintered body may be further machined to a desired shape, if necessary.

The sintered body resulting from the sintered body preparing step should preferably contain 60 to 99% by volume, more preferably 80 to 98% by volume of tetragonal $R_2T_{14}X$ compound (specifically, $R^1{}_2T_{14}X$ compound) as the major phase. The balance of the sintered body includes 0.5 to 20% by volume of rare earth-rich phase, and 0.1 to 10% by volume of rare earth oxides and at least one of rare earth carbides, nitrides and hydroxides originating from incidental impurities, or a mixture or composite thereof.

The next powder forming step is to form a powdered alloy containing $R^2$, M and B wherein $R^2$ is at least one element selected from rare earth elements and essentially contains Dy and/or Tb, M is at least one element selected from the group consisting of Fe, Cu, Al, Co, Mn, Ni, Sn and Si, and B is boron.

Although the composition of the alloy containing $R^2$, M and B is not particularly limited, a composition consisting essentially of 5 to 60 at % of $R^2$, 5 to 70 at % of M, and from more than 20 at % to 70 at % of B is preferable. Inclusion of incidental impurities is permissible. Specifically, an alloy containing $R^2MB_4$, $R^2M_2B_2$, $R^2M_4B_4$, $R^2{}_3MB_7$ or $R^2{}_5M_2B_6$ as the major phase is preferred.

$R^2$ is at least one element selected from rare earth elements and essentially contains dysprosium (Dy) and/or terbium (Tb). According to the invention, the alloy should have a $R^2$ content of 5 to 60 at %, preferably at least 10 at %, with the upper limit being up to 60 at %, preferably up to 50 at %. If the $R^2$ content is less than 5 at %, little grain boundary diffusion takes place and only a short amount of $R^2$ is fed, failing to obtain satisfactory coercivity. If the $R^2$ content exceeds 60 at %, excessive $R^2$ diffuses into the magnet, resulting in a lowering of major phase content and a lowering of remanence due to body diffusion of Dy and/or Tb in $R^2$ into the magnet major phase. Also, if the $R^2$ content exceeds 60 at %, the low-melting liquid phase component penetrating out of the magnet interior in the diffusion heat treatment reacts with $R^2$ so that the amount of molten layer formed on the magnet surface is increased, which is likely to fuse to the adjacent magnet or jig in contact, resulting in a reduced throughput.

M is at least one element selected from the group consisting of Fe, Cu, Al, Co, Mn, Ni, Sn and Si as mentioned above. According to the invention, the alloy should have a M content of 5 to 70 at %, preferably at least 8 at %, with the upper limit being preferably up to 60 at %, more preferably up to 50 at %.

According to the invention, the alloy should have a B content of from more than 20 at % to 70 at %, preferably at least 30 at %, more preferably at least 35 at %, with the upper limit being preferably up to 60 at %. The reason is as follows. As a result of reaction of a low-melting liquid phase component penetrating out of the magnet interior in the course of diffusion heat treatment with the covering B-containing alloy powder, a B-rich high-melting phase, typically $R^2Fe_4B_4$ phase is formed on the magnet surface. As the B content of the diffusion source increases, the proportion of the B-rich phase in the residual layer on the magnet surface increases. This prevents fusion between magnet pieces in contact or between a magnet piece and a jig in contact during diffusion heat treatment, which in turn improves the efficiency of working and hence, the throughput. If the B content of the diffusion source is 20 at % or less, the proportion of the B-rich phase is reduced, failing to prevent fusion. If the B content exceeds 70 at %, the amount of B diffused into the magnet during diffusion heat treatment increases and largely deviates from the optimum value of the matrix magnet composition, detracting from magnetic properties.

The alloy containing $R^2$, M and B may contain other elements as incidental impurities. Although the content of incidental impurities is preferably as low as possible, a content of up to 10% by weight based on the total of magnet-constituting elements and incidental impurities is permissible.

The alloy containing $R^2$, M and B may be prepared by melting metal feeds by high frequency induction heating, plasma arc melting or electric arc melting. The alloy thus prepared is preferably homogenized in vacuum or inert gas atmosphere at a temperature of 500 to 1,200° C. for 1 to 500 hours, more preferably 1 to 100 hours. The homogenizing treatment helps coarse stable intermetallic compound crystals to form so that the alloy becomes more fragile. Then a powdered alloy having a low impurity concentration can be prepared at a high efficiency. With the above-mentioned alloy composition, the homogenizing treatment ensures that the volume ratio of phases of a $R^2$-rich compound and a compound composed of $R^2$ and M is reduced while the phase of a compound consisting of $R^2$, M and B (such as $R^2 MB_4$, $R^2M_2B_2$, $R^2M_4B_4$, $R^2{}_3$ $MB_7$ or $R^2{}_5M_2B_6$) becomes the major phase. As compared with the intermetallic compound of $R^2$—Fe-M, the danger of ignition or combustion is reduced, and the milling step and the alloy powder applying step are improved in safety.

The alloy ingot prepared as above is milled by any well-known milling method, for example, on a ball mill, jet mill, stamp mill or disk mill to an average particle size of preferably 1 to 50 μm, more preferably 1 to 20 μm, obtaining an alloy powder. Besides the above milling methods, other milling means such as hydrogen decrepitation may also be employed. The average particle size may be determined as the weight average value $D_{50}$ (i.e., particle diameter at which the accumulative weight reaches 50% or median diameter) by a particle size distribution measuring system based on laser diffractometry.

Alternatively, an alloy powder of spherical particles containing $R^2$, M and B may be obtained by applying the gas atomizing method to the alloy ingot which has been prepared by RF induction melting, plasma arc melting or electric arc melting.

Also, the powder forming step may employ a method including preparing a powder of oxides of $R^2$, M and B from a metal salt and/or metal salt hydrate as raw material by the sol-gel method, and subjecting the powder to reductive diffusion reaction with the aid of a reducing agent. The powder alloy obtained from this method already contains a compound phase consisting of $R^2$, M and B as the major phase.

Next, the alloy powder is disposed on the surface of the sintered body. The step of disposing the alloy powder on the surface of the sintered body matrix is performed, for example, by dispersing the alloy powder in water or an organic solvent such as an alcohol to form a slurry, immersing the sintered body matrix in the slurry, pulling it up, and drying it with hot air or in vacuum, or by holding it in air. It is effective to use a thickened solvent in order that the coating weight be controlled. Spray coating is also possible.

The final step is a heat treatment of the alloy-covered sintered body in vacuum or inert gas atmosphere (e.g., Ar or He) at a temperature not higher than the sintering temperature. The heat treatment includes heating the sintered body matrix at a temperature and holding it at the temperature in the state that it is covered on its surface with the alloy powder.

In this step, a plurality of alloy-covered sintered bodies may be laid up before heat treatment is carried out on the laminate. Although the heat treatment conditions vary with the type and composition of constituent elements of the covering alloy powder, preferred conditions are such that $R^2$ is enriched at grain boundaries within the sintered body or in proximity to grain boundaries within the sintered body and such that B is not enriched at grain boundaries within the sintered body or in the sintered body major phase. Specifically, it is preferred from the aspect of attaining a sufficient coercivity enhancing effect and the aspect of suppressing a decline of coercivity due to grain growth that the alloy-covered sintered body is heated at a temperature of higher than 600° C., more preferably at least 700° C., even more preferably at least 800° C., and up to 1,100° C., more preferably up to 1,050° C., even more preferably up to 1,000° C., for thereby achieving grain boundary diffusion of $R^2$ element into the sintered body.

The heat treatment time is preferably 1 minute to 50 hours, more preferably 30 minutes to 30 hours. This time range is preferred from the aspect of driving the reaction of the low-melting liquid phase component penetrating out of the magnet interior with the alloy powder and the diffusion treatment to completion, and from the aspect of avoiding the problems that the sintered body structure is altered, that incidental oxidation and evaporation of some components adversely affect magnetic properties, and that $R^2$, M and B are not enriched only at grain boundaries or in proximity to grain boundaries within major phase grains, but diffused into the interior of major phase grains.

The heat treatment may be followed by aging treatment. The aging treatment is preferably a heat treatment at a temperature of at least 400° C., especially at least 430° C. and up to 600° C., especially up to 550° C. for a time of at least 30 minutes, especially at least 1 hour and up to 10 hours, especially up to 5 hours in vacuum or inert gas atmosphere such as Ar gas.

In the diffusion heat treatment course in the heat treatment step using the alloy powder, the low-melting liquid phase component penetrating out of the sintered body matrix interior reacts with the alloy powder coated on the sintered body matrix surface to form a stable phase having a high concentration of M (e.g., Fe) on the sintered body matrix surface. In this course, the excess of element $R^2$ constituting the coated alloy diffuses into the magnet interior, which is effective for suppressing an outstanding increase of $R^2$ concentration in proximity to the magnet surface. As a result, the decline of Br after diffusion treatment is reduced. Even when a plurality of magnet bodies are arrayed in close contact, the grain boundary diffusion treatment using the alloy powder is also effective for suppressing mutual reaction and hence, preventing the magnet bodies from fusing together. It is noted that the degree of fusion can be judged, for example, by manually separating apart a plurality of stacked (or fused) magnet pieces after heat treatment. Alternatively, a plurality of stacked magnet pieces are separated by a loading tester so that the pieces are sled in a shear direction, the load required for separation is measured, and judgment is made from the measured load. In practice, the load is desirably up to about 10 N.

EXAMPLES

Examples and Comparative Examples are given below by way of illustration and not by way of limitation.

Example 1

There were furnished Nd metal, Pr metal, ferroboron alloy, electrolytic Co, Al metal, Cu metal, Ga metal, Zr metal and electrolytic iron (all metals having a purity of 99% or higher). By weighing and blending the metal feeds to a desired composition: TRE 13.1, Co 1.0, B 6.0, Al 0.5, Cu 0.1, Zr 0.1, Ga 0.1, Fe bal., expressed in at %, melting them, casting the melt by the strip casting method, a starting alloy was obtained in flake form having a thickness of 0.2 to 0.4 mm. The starting alloy was subjected to hydrogen decrepitation, that is, hydrogen embrittlement in a pressurized hydrogen atmosphere, obtaining a coarsely ground powder. To the coarse powder, 0.1 wt % of stearic acid as lubricant was added and mixed. The coarse powder was finely milled on a gas flow milling unit, specifically jet mill using nitrogen stream, into a fine powder (or powdered alloy) having a particle size $D_{50}$ of ~3 μm. Notably, the particle size $D_{50}$ is a volume basis median diameter measured by the laser diffraction method based on gas flow scattering (the same holds true, hereinafter). In an inert gas atmosphere, a mold of a compacting machine was charged with the fine powder. While a magnetic field of 15 kOe (1.19 MA/m) was applied for orientation, the powder was compression molded in a direction perpendicular to the magnetic field. The green compact had a density of 3.0 to 4.0 g/cm$^3$. The compact was sintered in vacuum above 1,050° C. for 5 hours, obtaining a sintered body matrix. The sintered body matrix had a density of at least 7.5 g/cm$^3$, a remanence Br of 1.478 T as measured by BH tracer, and a coercivity Hcj of 878 kA/m as measured by a pulse tracer (both by Toei Industry Co., Ltd., the same holds true, hereinafter).

Figure 2:
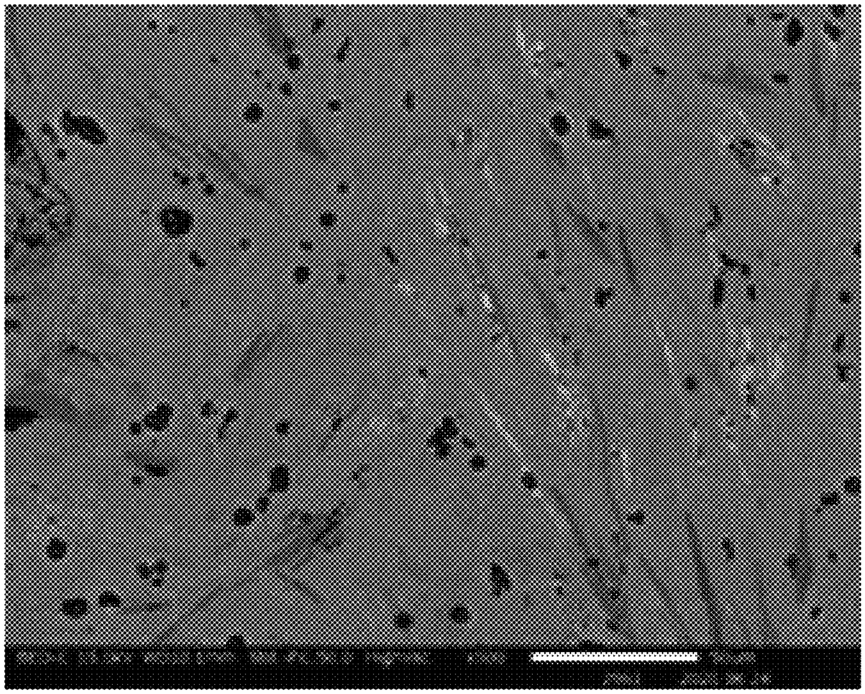
FIG. 2 is a backscattered electron composition image of a powder-forming alloy after homogenization treatment in Example 1.
Figure 3:
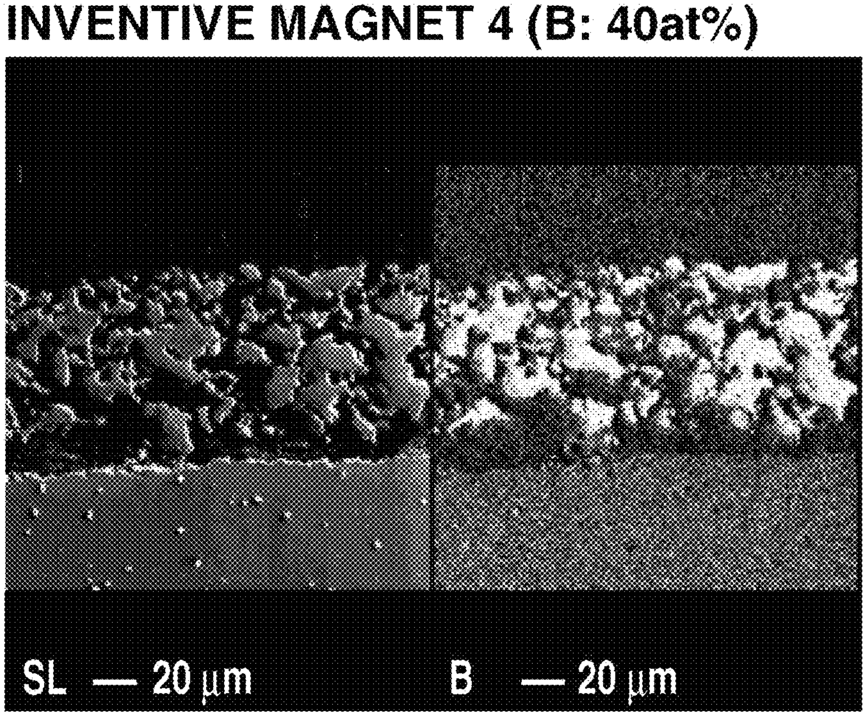
FIG. 3 is a secondary electron image showing a residual layer of alloy powder having a B content of 40 at % formed on the surface of the magnet (inventive magnet 4) in Example 2 and a B distribution therein.
Figure 4:
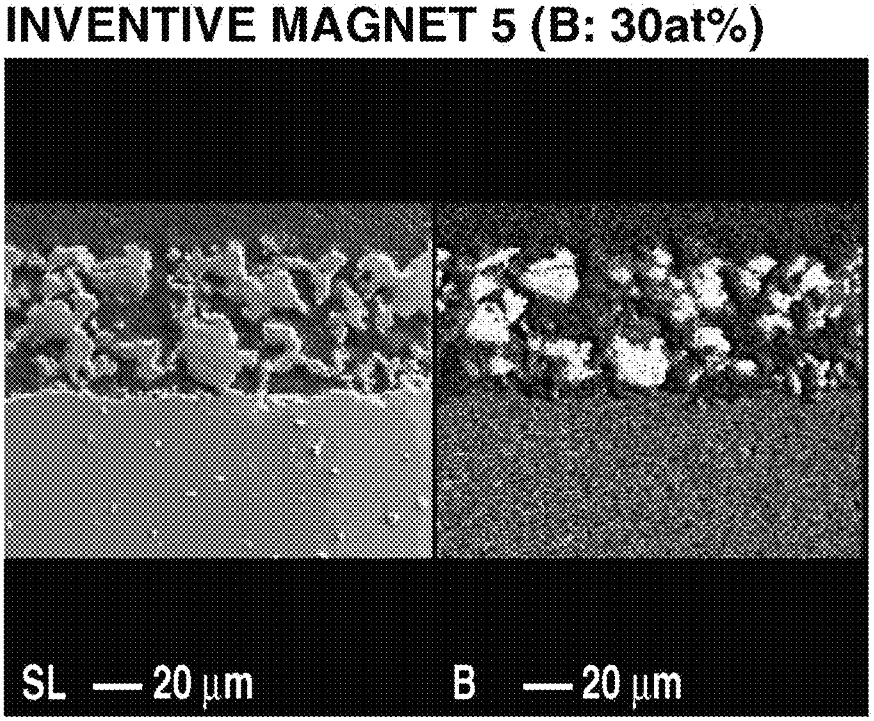
FIG. 4 is a secondary electron image showing a residual layer of alloy powder having a B content of 30 at % formed on the surface of the magnet (inventive magnet 5) in Example 2 and a B distribution therein.
Figure 5:
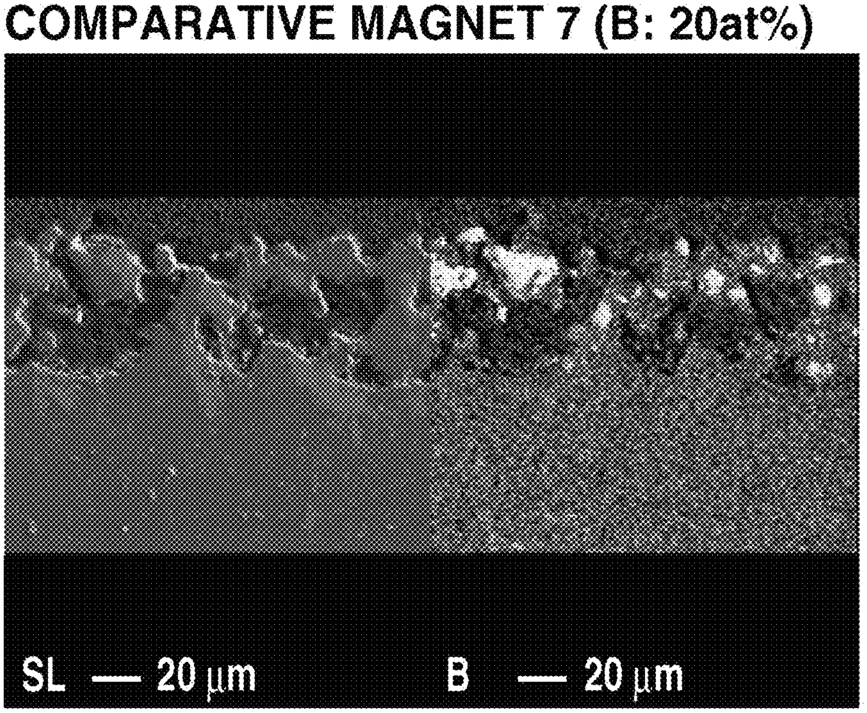
FIG. 5 is a secondary electron image showing a residual layer of alloy powder having a B content of 20 at % formed on the surface of the magnet (comparative magnet 7) in Comparative Example 3 and a B distribution therein.
Figure 6:
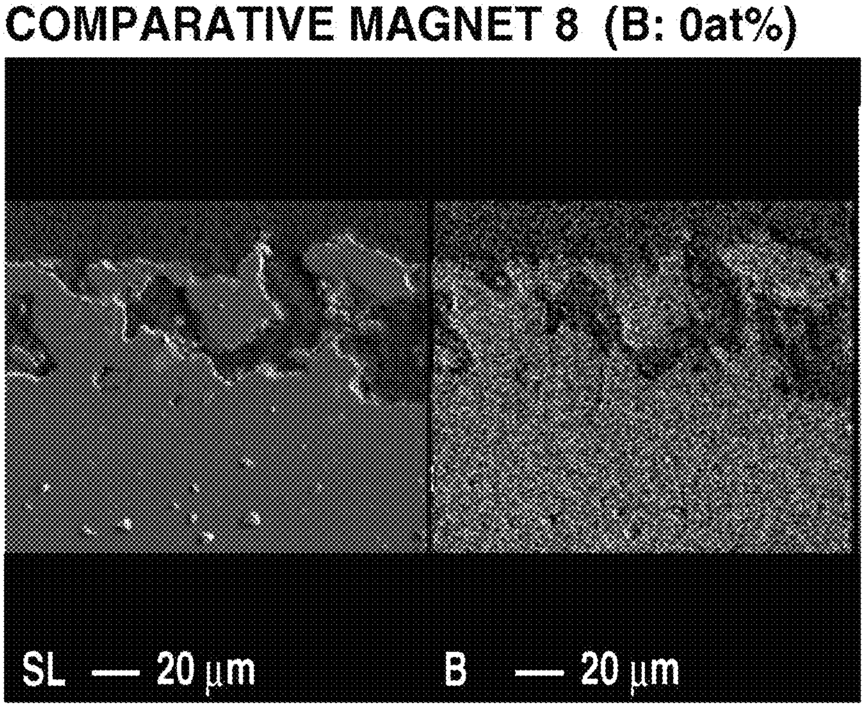
FIG. 6 is a secondary electron image showing a residual layer of alloy powder having a B content of 0 at % formed on the surface of the magnet (comparative magnet 8) in Comparative Example 3 and a B distribution therein.

There were furnished Tb metal, ferroboron alloy and electrolytic iron. An alloy ingot was formed by weighing and blending the metal feeds to a desired composition: $Tb_5Fe_2B_6$, expressed in atomic ratio, and melting them in an arc melting furnace. The ingot was heat treated in Ar atmosphere at 800° C. for 50 hours for homogenization. FIGS. 1 and 2 are backscattered electron composition images of the alloy before and after homogenization treatment, respectively. As seen from these figures, the $Tb_5Fe_2B_6$ phase having a grain size of at least 10 μm was mainly formed by the homogenization treatment.

Next, the alloy as heat treated was milled on a ball mill into an alloy powder having a particle size $D_{50}$ of ~10 μm. The alloy powder was dispersed in ethanol in a weight ratio of 1:1 to forma slurry.

The sintered body matrix was machined into a piece of 20 mm×20 mm×3.2 mm. The procedure of immersing the piece in the slurry, pulling up, and drying in hot air was repeated several times until the alloy powder was coated onto the surface of the magnet matrix in a coating weight of 69 to 192 μg/mm$^2$ (weight of alloy deposit per unit area). Three such samples were laid up. The laminate was placed in a heat treatment furnace where it was heated and held in vacuum at 900° C. for 20 hours, then slowly cooled down to 300° C., heated at 500° C. in the furnace, held at the temperature for 2 hours, and finally quenched to 300° C.

The resulting magnet was measured for Br and Hcj by the BH tracer and pulse tracer, with the results shown in Table 1. As seen from Table 1, the magnet showed substantially no lowering of Br before and after the diffusion treatment, and a significant improvement in Hcj. No fusion was acknowledged among the three laid-up magnet pieces.

TABLE 1

| | Alloy composition | Coating weight (μg/mm$^2$) | Magnetic properties after diffusion treatment Br (T) | Hcj (kA/m) | Fusion |
|---|---|---|---|---|---|
| Inventive magnet 1 | $Tb_5Fe_2B_6$ | 69 | 1.483 | 1509 | nil |
| Inventive magnet 2 | $Tb_5Fe_2B_6$ | 105 | 1.484 | 1602 | nil |
| Inventive magnet 3 | $Tb_5Fe_2B_6$ | 192 | 1.484 | 1628 | nil |

Comparative Example 1

There were furnished Tb metal and electrolytic Co. An alloy ingot was formed by weighing and blending the metal feeds to a desired composition: $Tb_3Co_1$, expressed in atomic ratio, and melting them in an arc melting furnace. Without homogenization, the alloy was milled on a ball mill into an alloy powder having a particle size $D_{50}$ of ~18 μm. The alloy powder was dispersed in ethanol in a weight ratio of 1:1 to form a slurry.

The same sintered body matrix as in Example 1 was machined into a piece of 20 mm×20 mm×3.2 mm. The procedure of immersing the piece in the slurry, pulling up, and drying in hot air was repeated several times until the alloy powder was coated onto the surface of the magnet matrix in a coating weight of 106 to 178 μg/mm$^2$. Three such samples were laid up. The laminate was placed in a heat treatment furnace where it was heated and held in vacuum at 900° C. for 20 hours, then slowly cooled down to 300° C., heated at 500° C. in the furnace, held at the temperature for 2 hours, and finally quenched to 300° C.

The resulting magnet was measured for Br and Hcj by the BH tracer and pulse tracer, with the results shown in Table 2. As seen from Table 2, Br lowered by 0.014 to 0.032 T although a high Hcj enhancing effect was found. Fusion was acknowledged among the three magnet pieces.

TABLE 2

| | Alloy composition | Coating weight (μg/mm²) | Magnetic properties after diffusion treatment Br (T) | Hcj (kA/m) | Fusion |
|---|---|---|---|---|---|
| Comparative magnet 1 | $Tb_3Co$ | 106 | 1.464 | 1638 | fused |
| Comparative magnet 2 | $Tb_3Co$ | 144 | 1.452 | 1694 | fused |
| Comparative magnet 3 | $Tb_3Co$ | 178 | 1.446 | 1694 | fused |

Comparative Example 2

There were furnished Nd metal, Pr metal, ferroboron alloy, electrolytic Co, Al metal, Cu metal, Zr metal, and electrolytic iron (all metals having a purity of 99% or higher). By weighing and blending the metal feeds to a desired composition: TRE 14.8, Co 1.0, B 6.0, Al 0.5, Cu 0.1, Zr 0.1, Fe bal., expressed in at %, melting them, casting the melt by the strip casting method, a starting alloy was obtained in flake form having a thickness of 0.2 to 0.4 mm. The starting alloy was subjected to hydrogen decrepitation, that is, hydrogen embrittlement in a pressurized hydrogen atmosphere, obtaining a coarsely ground powder. To the coarse powder, 0.1 wt % of stearic acid as lubricant was added and mixed. The coarse powder was finely milled on a gas flow milling unit, specifically jet mill using nitrogen stream, into a fine powder (or powdered alloy) having a particle size $D_{50}$ of ~3.5 μm. In an inert gas atmosphere, a mold of a compacting machine was charged with the fine powder. While a magnetic field of 15 kOe (1.19 MA/m) was applied for orientation, the powder was compression molded in a direction perpendicular to the magnetic field. The green compact had a density of 3.0 to 4.0 g/cm³. The compact was sintered in vacuum above 1,050° C. for 5 hours, obtaining a sintered body matrix. The sintered body matrix had a density of at least 7.5 g/cm³, a remanence Br of 1.409 T, and a coercivity Hcj of 973 kA/m.

There were furnished Tb metal and Cu metal. An alloy ribbon was formed by weighing and blending the metal feeds in a ratio Tb 70 at % and Cu 30 at %, melting them by RF heating, and casting the melt onto a spinning Cu chill roll for quenching. Without homogenization, the alloy ribbon was milled on a ball mill into an alloy powder having a particle size $D_{50}$ of ~48 μm. The alloy powder was dispersed in ethanol in a weight ratio of 1:1 to forma slurry.

The sintered body matrix was machined into a piece of 20 mm×20 mm×3.2 mm. The procedure of immersing the piece in the slurry, pulling up, and drying in hot air was repeated several times until the alloy powder was coated onto the surface of the magnet matrix in a coating weight of 78 to 133 μg/mm². Three such samples were laid up. The laminate was placed in a heat treatment furnace where it was heated and held in vacuum at 875° C. for 10 hours, then slowly cooled down to 300° C., heated at 500° C. in the furnace, held at the temperature for 2 hours, and finally quenched to 300° C.

The resulting magnet was measured for Br and Hcj by the BH tracer and pulse tracer, with the results shown in Table 3. As seen from Table 3, Br lowered by 0.015 to 0.024 T although a high Hcj enhancing effect was found. Fusion was acknowledged among the three magnet pieces.

TABLE 3

| | Alloy composition | Coating weight (μg/mm²) | Magnetic properties after diffusion treatment Br (T) | Hcj (kA/m) | Fusion |
|---|---|---|---|---|---|
| Comparative magnet 4 | $Tb_{70}Cu_{30}$ | 78 | 1.394 | 1663 | fused |
| Comparative magnet 5 | $Tb_{70}Cu_{30}$ | 99 | 1.389 | 1707 | fused |
| Comparative magnet 6 | $Tb_{70}Cu_{30}$ | 133 | 1.385 | 1723 | fused |

Example 2 and Comparative Example 3

There were furnished Tb metal and FeB material. An alloy ingot was formed by weighing and blending the metal feeds to a desired composition: $Tb_{20}Fe_{40}B_{40}$ (Example), $Tb_{30}Fe_{40}B_{30}$ (Example), $Tb_{20}Fe_{55}B_{25}$ (Example), $Tb_{20}Fe_{58}B_{22}$ (Example), $Tb_{20}Fe_{60}B_{20}$ (Comparative Example), or $Tb_{20}Fe_{80}$ (Comparative Example), expressed in atomic ratio, and melting them in an arc melting furnace. Without homogenization, the alloy was milled on a ball mill into an alloy powder having a particle size $D_{50}$ of ~10 μm. The alloy powder was dispersed in ethanol in a weight ratio of 1:1 to form a slurry.

The same sintered body matrix as in Example 1 was machined into a piece of 20 mm×20 mm×3.2 mm. The procedure of immersing the piece in the slurry, pulling up, and drying in hot air was repeated several times until the alloy powder was coated onto the surface of the magnet matrix in a coating weight of 199 to 290 μg/mm². Two such pieces were stacked one on the other. The stack was placed in a heat treatment furnace where it was heated and held in vacuum at 900° C. for 20 hours, then slowly cooled down to 300° C., heated at 500° C. in the furnace, held at the temperature for 2 hours, and finally quenched to 300° C.

The stack of two magnet pieces after the diffusion heat treatment was set in a loading tester where the two pieces were separated apart by sliding them in a shear direction. The load required to separate the magnet pieces apart is shown in Table 4. It is believed that the load necessary to manually separate apart magnet pieces in a fused stack (for recovering discrete magnet pieces) is desirably less than about 10 N. The loads required for the magnet pieces within the scope of the invention are fully lower than that value.

On the surface of a magnet piece after the diffusion heat treatment, a residue is deposited as a result of reaction of the covering alloy powder with a low-melting liquid phase component penetrating out of the magnet interior. FIGS. 3 to 6 show secondary electron images of the residual layer of alloy powder (formed on the magnet surface) having a B content of 40 at % (Inventive magnet 4), 30 at % (Inventive magnet 5), 20 at % (Comparative magnet 7), and 0 at % (Comparative magnet 8) and B distributions therein, respectively. As seen from FIGS. 3 to 6, as the B content increases, the proportion of $R^2Fe_4B_4$ phase in the residual layer increases. Table 4 shows the area fraction of $R^2Fe_4B_4$ phase in the residual layer. As the proportion of $R^2Fe_4B_4$ phase in the residual layer increases, the degree of fusion is reduced, suggesting ease of working for the recovery of magnet pieces after the diffusion heat treatment. From the practical working aspect, the load required for separation is desirably less than about 10 N. The B-rich phase preferably accounts for at least about 40% by volume of the residual layer.

TABLE 4

| | Alloy composition | Coating weight (μg/mm²) | Load (N) | Area fraction of $R^2Fe_4B_4$ phase in surface residual layer (%) |
|---|---|---|---|---|
| Inventive magnet 4 | $Tb_{20}Fe_{40}B_{40}$ | 272 | 0 | 93 |
| Inventive magnet 5 | $Tb_{30}Fe_{40}B_{30}$ | 222 | 0 | 78 |
| Inventive magnet 6 | $Tb_{20}Fe_{55}B_{25}$ | 264 | 0 | 51 |
| Inventive magnet 7 | $Tb_{20}Fe_{58}B_{22}$ | 249 | 0 | 43 |
| Comparative magnet 7 | $Tb_{20}Fe_{60}B_{20}$ | 199 | 11 | 39 |
| Comparative magnet 8 | $Tb_{20}Fe_{80}$ | 290 | 33 | 0 |

Japanese Patent Application No. 2020-188449 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing a rare earth sintered magnet comprising the steps of:

preparing a plurality of $R^1$-T-X sintered bodies each having a major phase of $R^1{}_2T_{14}X$ composition wherein $R^1$ is at least one element selected from rare earth elements, and wherein at least one $R^1$ group is Pr or Nd, T is selected from the group consisting of Fe, Co, Al, Ga, and Cu, and wherein at least one T group is Fe, and X is boron and/or carbon, and wherein the plurality of $R^1$-T-X sintered bodies each contains 60 to 99% by volume of the $R^1{}_2T_{14}X$ composition as the major phase, forming an alloy powder, which is formed of an alloy containing $R^2$, M and B wherein $R^2$ is at least one element selected from rare earth elements, and wherein at least one $R^2$ group is Dy or Tb, M is at least one element selected from the group consisting of Fe, Cu, Al, Co, Mn, Ni, Sn and Si, and B is boron, the alloy containing 5 to 60 at % of $R^2$, 5 to 70 at % of M, and from more than 20 at % to 70 at % of B, disposing the alloy powder on the surface of each of the plurality of sintered bodies to obtain a plurality of alloy-covered sintered bodies, laminate the plurality of alloy-covered sintered bodies to form a laminate, heat treating the laminate in vacuum or inert gas atmosphere at a temperature not higher than a sintering temperature of the plurality of sintered bodies, and separating each of the alloy-covered sintered bodies from the laminate.

2. The method of claim 1 wherein the alloy contains at least one phase selected from $R^2MB_4$, $R^2M_2B_2$, $R^2M_4B_4$, $R^2{}_3MB_7$, and $R^2{}_5M_2B_6$ phases.

3. The method of claim 2 wherein the alloy powder forming step includes melting metal feeds containing $R^2$, M and B by high frequency induction heating, plasma arc melting or electric arc melting.

4. The method of claim 2 wherein the alloy powder forming step includes homogenizing the alloy in vacuum or inert gas atmosphere at 500 to 1,200° C. for 1 to 500 hours.

5. The method of claim 2 wherein the alloy powder forming step includes milling the alloy in inert gas atmosphere.

6. The method of claim 2 wherein the alloy powder forming step includes atomizing the alloy into spherical particles by the gas atomization method.

7. The method of claim 2 wherein the alloy powder forming step includes forming an oxide powder of $R^2$, M and B from a metal salt and/or metal salt hydrate by the sol-gel method, and subjecting the oxide powder to reductive diffusion reaction with a reducing agent.

8. The method of claim 2 wherein the alloy powder forming step includes adjusting an average particle size of the alloy powder to a range of 1 to 50 μm, where the average particle size is defined as a volume basis median diameter $D_{50}$ as measured by a laser diffraction method based on gas flow dispersion.

9. The method of claim 1 wherein the alloy powder forming step includes melting metal feeds containing $R^2$, M and B by high frequency induction heating, plasma arc melting or electric arc melting.

10. The method of claim 1 wherein the alloy powder forming step includes homogenizing the alloy in vacuum or inert gas atmosphere at 500 to 1,200° C. for 1 to 500 hours.

11. The method of claim 1 wherein the alloy powder forming step includes milling the alloy in inert gas atmosphere.

12. The method of claim 1 wherein the alloy powder forming step includes atomizing the alloy into spherical particles by the gas atomization method.

13. The method of claim 1 wherein the alloy powder forming step includes forming an oxide powder of $R^2$, M and B from a metal salt and/or metal salt hydrate by the sol-gel method, and subjecting the oxide powder to reductive diffusion reaction with a reducing agent.

14. The method of claim 1 wherein the alloy powder forming step includes adjusting an average particle size of the alloy powder to a range of 1 to 50 μm, where the average particle size is defined as a volume basis median diameter $D_{50}$ as measured by a laser diffraction method based on gas flow dispersion.

15. The method of claim 1 wherein said $R^1$ is at least one element selected from Pr and Nd, and said T is Fe, and said $R^2$ at least one element selected from Dy and Tb.

16. The method of claim 1 wherein the alloy contains from 22 at % to 70 at % of B.

17. The method of claim 16 wherein the alloy contains from 25 at % to 70 at % of B.

18. The method of claim 16 wherein the alloy contains from 22 at % to 60 at % of B.

19. The method of claim 16 wherein the alloy contains from 22 at % to 40 at % of B.

20. A method for manufacturing a rare earth sintered magnet comprising the steps of:

preparing a plurality of $R^1$-T-X sintered bodies each having a major phase of $R^1_2T_{14}X$ composition wherein $R^1$ is at least one element selected from Pr and Nd, T is Fe, and X is at least one element selected from boron and carbon, and wherein the plurality of $R^1$-T-X sintered bodies each contains 60 to 99% by volume of the $R^1_2T_{14}X$ composition as the major phase, forming an alloy powder, which is formed of an alloy containing $R^2$, M and B wherein $R^2$ is at least one element selected from Dy and Tb, M is at least one element selected from the group consisting of Fe, Cu, Al, Co, Mn, Ni, Sn and Si, and B is boron, the alloy containing 5 to 60 at % of $R^2$, 5 to 70 at % of M, and from more than 20 at % to 70 at % of B, disposing the alloy powder on the surface of each of the plurality of the sintered bodies to obtain a plurality of alloy-covered sintered bodies, laminate the plurality of alloy-covered sintered bodies to form a laminate, heat treating the laminate in vacuum or inert gas atmosphere at 600° C. to 1100° C., and separating each of the alloy-covered sintered bodies from the laminate.

21. The method of claim 20 wherein said $R^1$ further comprises at least one element selected from rare earth elements except Pr and Nd, said T further comprises at least one element selected from the group consisting of Co, Al, Ga, and Cu, and said $R^2$ further comprises at least one element selected from rare earth elements except Dy and Tb.

22. The method of claim 20 wherein said $R^1$ is Nd, and said $R^2$ is Tb.

23. The method of claim 20 wherein the alloy contains from 22 at % to 70 at % of B.

24. The method of claim 23 wherein the alloy contains from 25 at % to 70 at % of B.

25. The method of claim 23 wherein the alloy contains from 22 at % to 60 at % of B.

26. The method of claim 23 wherein the alloy contains from 22 at % to 40 at % of B.

* * * * *